(12) United States Patent
Markham

(10) Patent No.: US 6,897,968 B1
(45) Date of Patent: May 24, 2005

(54) APPARATUS AND METHOD FOR COUNTING PIXELS IN PRINT DATA

(75) Inventor: Roger Guy Markham, Meridian, ID (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/433,586

(22) Filed: Nov. 4, 1999

(51) Int. Cl.$^7$ ............................................. G06F 13/00
(52) U.S. Cl. ................... 358/1.1; 358/426.09; 382/194
(58) Field of Search ......... 382/194; 358/426.01–426.09

(56) References Cited

U.S. PATENT DOCUMENTS

| | | | | |
|---|---|---|---|---|
| 5,077,806 A | * | 12/1991 | Peters et al. ................. | 382/141 |
| 5,287,452 A | * | 2/1994 | Newman ..................... | 345/520 |
| 5,729,351 A | * | 3/1998 | Oh .............................. | 358/296 |
| 5,818,607 A | * | 10/1998 | Nakamura et al. ..... | 358/426.05 |
| 6,038,340 A | * | 3/2000 | Ancin et al. ................ | 382/167 |
| 6,145,947 A | * | 11/2000 | Inora et al. .................... | 347/7 |

\* cited by examiner

*Primary Examiner*—Edward Coles
*Assistant Examiner*—Alan Rahimi
(74) *Attorney, Agent, or Firm*—Oliff & Berridge, PLC

(57) ABSTRACT

An independent hardware pixel counter counts bits of print data in regions of interest. The independent pixel counter can be an application specific integrated circuit (ASIC), and is separate from a control processor. The independent hardware pixel counter selectively monitors a data bus carrying image data to or from a memory. Once the pixels of the image data have been counted, the count data can be sent to the control processor in order to implement a print strategy. The pixel counter counts the print data at a point when image data is being sent to the memory, since at that point the image data is both uncompressed and in a raster format, and thus can be easily analyzed. Additionally, because the image data is stored in the memory until enough print data has accumulated for printing, the processor is provided with sufficient time to gather and use print information before the counted image data is printed.

24 Claims, 8 Drawing Sheets

FIG. 4
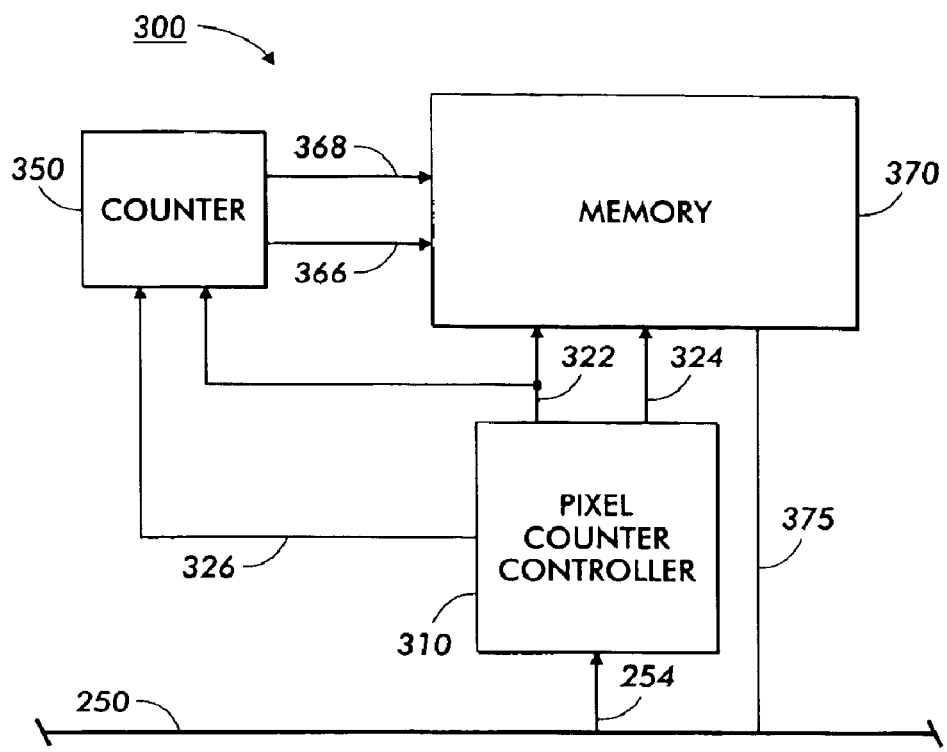
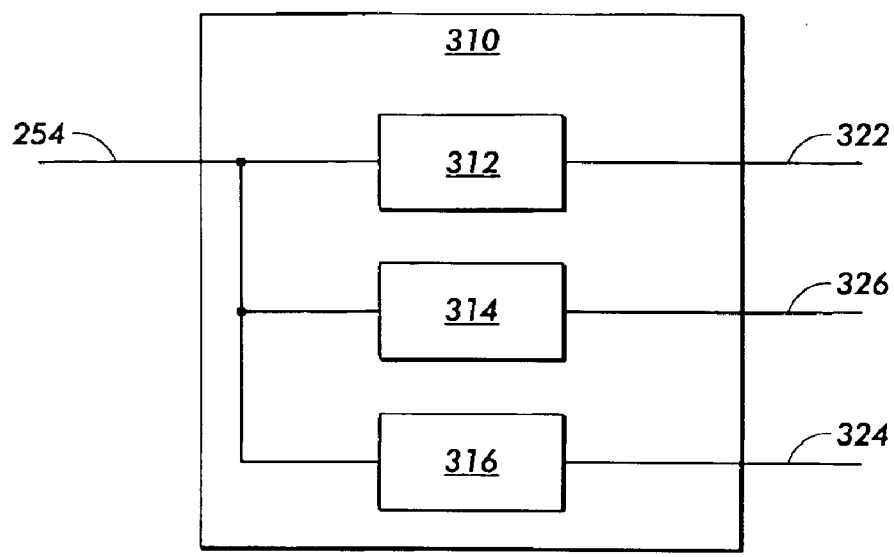
FIG. 5

US 6,897,968 B1

APPARATUS AND METHOD FOR COUNTING PIXELS IN PRINT DATA

BACKGROUND OF THE INVENTION

1. Field of Invention

This invention is directed to apparatus and methods for counting bits contained within print data prior to a printer using the print data to form an image.

2. Description of Related Art

Currently, limited processor and memory bandwidths limit the usefulness of low-cost printers, which need to handle large amounts of data to create high quality images. For example, color images today are generally printed at 600 spi or greater. Accordingly, to reduce to the loads on both processing and memory resources, acquiring information about the image to be printed before printing occurs is useful.

For example, in thermal and ink jet printing, knowing where large areas of heavy ink coverage exist in an image prior to printing is extremely valuable. This information can be used to choose a print mode, a print speed, a drying time, or the like. Additionally, it may also be important to know where printing does not occur, so that a print head may skip the corresponding area, and thereby reduce loads on both processing and memory resources.

SUMMARY OF THE INVENTION

Gathering information about a print image prior to printing is a very processor-intensive operation. Additionally, choosing a point within the flow of the print data to gather the image information can require redundant shifting of data within the memory. One technique to gather the information is to count the bits as the print data is supplied to the print head. However, once the print data is at the print head, controlling the printing characteristics based on the image information is impossible because the print data is already being printed. Another technique counts the bits as the print data is supplied to the printer from a print data source. However, as the print data is supplied, the raw data stream generated by the print source generally has commands embedded within that are not readily extractable. This raw data stream is also often in a compressed and/or encrypted format.

This invention provides systems and methods for counting bits of print data in regions of interest using an independent hardware pixel counter, such as an application specific integrated circuit (ASIC), that is separate from the control processor, to selectively monitor a data bus carrying image data to or from a memory. Once the pixels of the image data have been counted, the count data can be sent to the processor in order to implement a print strategy.

The systems and methods according to this invention take advantage of the fact that at a point when image data is being sent to the memory, the image data is both uncompressed and in a raster format, and thus can be easily analyzed. Additionally, in systems and methods according to this invention, the image data is stored in the memory until enough print data has accumulated for printing, which provides sufficient time to gather and use print information before the actual printing occurs.

These and other features and advantages of this invention are described in or are apparent from the following detailed description of the systems and methods according to this invention.

BRIEF DESCRIPTION OF THE DRAWINGS

Various exemplary preferred embodiments of systems and methods according to this invention will be described in detail, with reference to the following figures, wherein:

FIG. 4 is a block diagram of one exemplary embodiment of the pixel counter circuit of FIG. 1;

FIG. 5 is a block diagram of one exemplary embodiment of the pixel counter controller of FIG. 4;

DETAILED DESCRIPTION OF EXEMPLARY EMBODIMENTS

Figure 1:
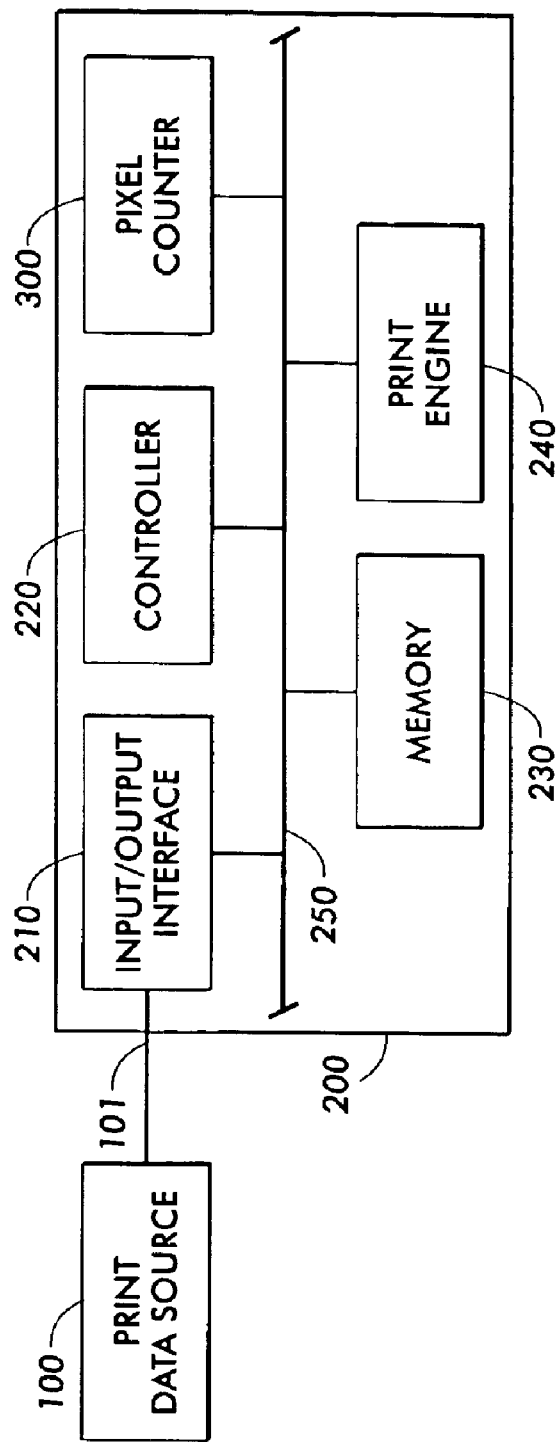
FIG. 1 is a block diagram of one exemplary embodiment of a pixel counting system according to this invention.

FIG. 1 shows a printing system 200, coupled to a print data source 100, that receives print data from the print data source 100 over a communication link 101. The printing system 200 includes a central bus 250 that interconnects an input/output interface 210, a controller 220, a memory 230, a pixel counter 300, and a print engine 240. The print data is received by the input/output interface 210 and sent via the bus 250 to the memory 230 under the control of the controller 220. The controller interprets and distributes the print data via the bus 250 to the memory 230 and/or to the print engine 240.

In general, the print data source 100 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. For example, the print data source 100 may be a scanner, or a data carrier such as a magnetic storage disk, CD-ROM or the like, or a host computer, that contains scanned image data. Thus, the print data source 100 can be any known or later developed source that is capable of providing print data to the input/output interface 210 of the print system 200.

The print data can include various components, such as control data and image data. The control data includes instructions that direct the print system 200, including the print engine 240, to perform various tasks that are required to print an image, such as paper feed, carriage return, print head positioning, or the like. The image data is the data that instructs the print head to mark the pixels of an image, for example, to eject one drop from an ink jet print head onto an image recording medium. The print data received from the print data source 100 can include both control data and image data and can be compressed and/or encrypted in various formats.

Accordingly, while the print data is sent from the I/O interface 210 to the memory 230 via the bus 250, the controller 220 can separate the print data into the control data and the image print data, respectively. Additionally, and if necessary, the controller 220 can decompress and/or decrypt the print data. Subsequently, the controller 220 directs the control data and the image data to appropriate portions of the memory 230.

The control data can include data pertaining to a data compression method, a print method (direction, speed, number of passes), the print quality (generally a combination of direction, speed, and number of passes), font data, text characters, and the like.

Figure 2:
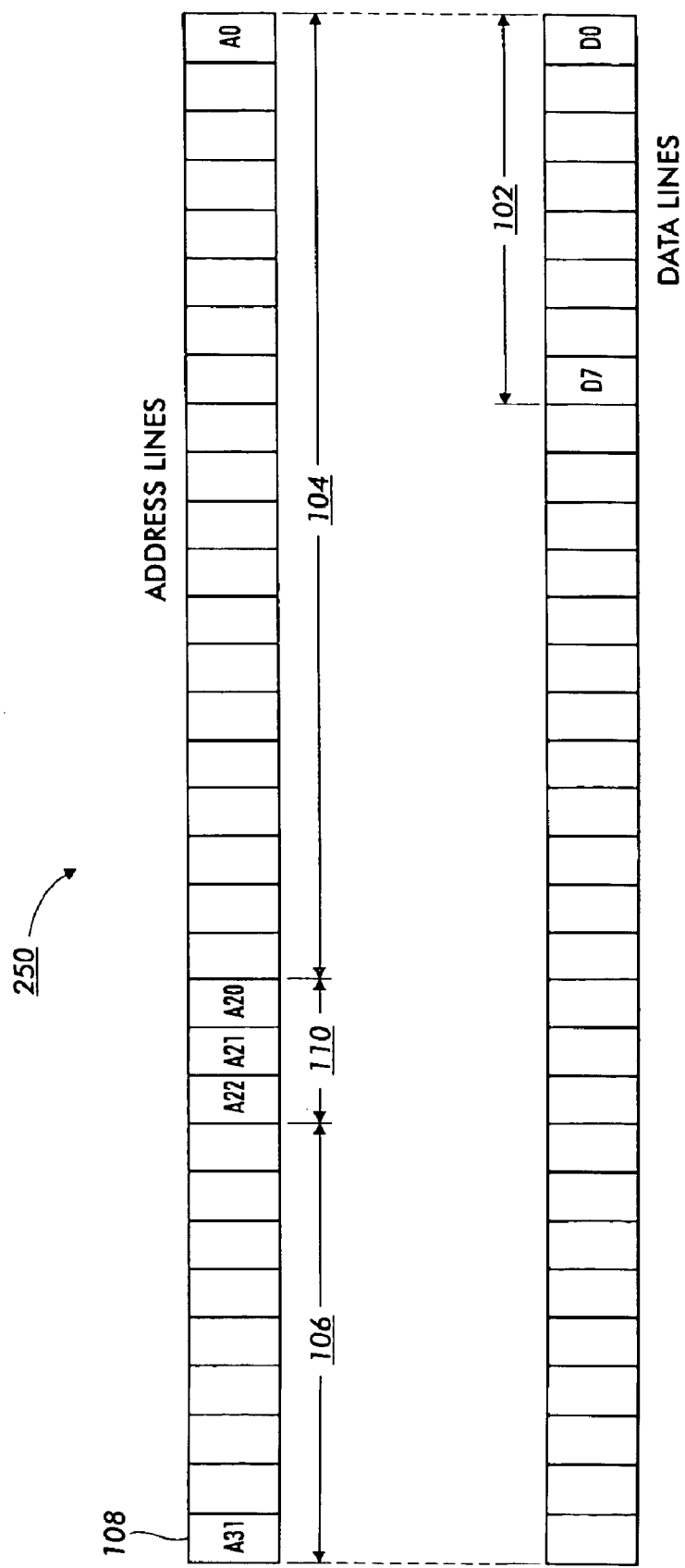
FIG. 2 is an exemplary diagram of the organization of the address and data on the CPU bus of FIG. 1.

Referring to FIG. 2, while most modern busses 250 are 32 bits wide in address and data, the print data 102 traveling on the bus 250 is generally narrower, usually only 8 bits wide and the range of usable addresses is generally 24 bits or less. Thus the 32-bit wide address portion of bus 250 is functionally divided into a number of distinct portions: a range of linear addresses is included in an address portion 104 (20 address lines), a range of device selection address lines is included in component address portion 110 (3 address lines) and an unused set of address lines is included in an unused portion 106.

While the bus 250 is shown in FIG. 2 as having separate portions for the address lines and the data lines, it should be understood that that the bus 250 can be configured in any known or later developed manner without departing form the spirit and scope of the present invention. For example, the bus 250 can be designed so that both the address and data lines are physically the same, while the address and data information is available on the shared lines at different time intervals, i.e, the address and data information can be multiplexed on the bus 250, or said differently, the bus 250 can be a multiplexed bus. Furthermore, the bus 250 can be designed so that both the address and data information are combined on the same physical bus, so that both the address information and the data information are available simultaneously.

The component address portion 110 determines whether the source/destination device is the memory 230 or other device on the bus. When the memory 230 is selected, the address transmitted over the address portion 104 is used to specify a memory address, or location, within the memory 230 in which the corresponding 8 bits of print data 102 are to be stored. A key element of the invention is that multiple combinations of component address portion bits 110 can be used to select the memory 230 and multiple destination devices can be simultaneously selected.

Similarly, the data portion 102 of the bus 250 connects to devices of varying data widths. In the simplest of systems, the data portion of the bus has a width of 8 bits. In more complex systems, the bus may have a width of 8 bits to peripheral devices, such as the input/output interface 210, 16 bits to non-volatile memory and 32 bits to dynamic memory 230 and the controller 220. In these more complex systems, the image data which is freshly extracted from the control data and image data stream is generally only 8 bits wide and may appear on a fixed portion of the data bus or be dynamically switched to banks of 8 contiguous 8 data lines based on the memory architecture and address (odd/even . . . ). In either case, the print data 102 should represent the image data bit lines whichever they may be at any instant.

The address lines of the component address portion 110 can be contiguous or dispersed, being larger or smaller in number at the expense of the unused portion 106. Thus, component selection can be compactly encoded in a few bits or fully decoded with one bit per device or combinations of both. In particular, one of the bit channels can be used as a flag portion 108 to transmit an image data flag. The image data flag indicates to the pixel counter 300 that the corresponding print data on the print data portion 102 of the data lines is image data. In response to either the address flag portion 108 and/or the component address portion 110 indicating valid image data is on the bus 250, the pixel counter 300 counts the pixels of the image data on the print data portion 102.

For example, when the image data flag portion 108 is used, if the image data flag on the image data flag portion 108 is set high (1), then the corresponding print data on the print data portion 102 is image data that the pixel counter 300 should subsequently count. However, if the image data flag on the image data flag portion 108 is set low, (0), then the corresponding print data on the print data portion 102 is not image data and should not be counted by the pixel counter 300.

The image data is directed via the bus 250 to the memory 230, where the image data is stored until sufficient data is present to efficiently begin printing the image on the recording medium. When the image data is sent to the memory 230 from the print data source 100, the controller 220 can set the normally-low image data flag on the image data flag portion 108 to the high position (i.e. the memory is addressed with an address with the data flag portion 108 set while all other writes to memory that do not contain image data are sent with the data flag portion 108 low in the address). As the image data is sent across the bus 250, the pixel counter 300 monitors the bus 250 for all data having a high image data flag on the image data flag portion 108. The pixel counter 300 can then count the active pixels in the print data on the print data portion 102 that has been flagged as image data Accordingly, the pixel counter 300 can selectively read only the image data from the bus 250 while the print data are being sent over the bus 250.

In a second exemplary embodiment, the print data is sent across the bus 250 to a particular element using data transmitted over the address portion 110 of the bus 250 to address particular components having a particular address in 110 or multiple addresses in 110. The pixel counter 300 monitors the bus 250 for values in the address portion 110 that indicate the transmitted data on the print data portion 102 is image data. For example, in this second exemplary embodiment, all print data that is addressed to the memory 230 could be considered to be image data by the pixel counter 300. The pixel counter 300 would then count the active pixels in the image data on the print data portion 102. Accordingly, the pixel counter 300 can selectively read only the image data from the bus 250 while the print data is being sent over the bus 250.

The image data is sent over the bus 250 from the controller 220 to the memory 230. In one exemplary embodiment, each high bit (1) of the image data represents a single active pixel of the complete image. An active pixel can represent, for example, a single spot of ink from an ink jet printer. Conversely, low bits (0) are used to represent non-active pixels, such as a blank pixel of the complete image.

As the image data is sent to the memory 230 via the bus 250, the pixel counter 300 counts the number of active pixels in the image data. To accomplish this, the pixel counter 300 divides the image data into rows of pixels, and then further divides each row into columns. By dividing the image data into rows and columns, the number of active pixels in a specific portion of the image data can be determined. The location of active pixels within the image can be helpful in generating the desired print quality and speed.

In particular, large areas of high ink coverage stress various subsystems of the printer engine 240. For example, the drying time of large high-coverage areas is much longer than areas of low ink coverage. Therefore, knowledge of the existence of a high coverage area, of a defined significant size, can be used to slow printing in such areas to allow extra drying time. This avoids smearing the printed image as the printed image travels from the print head to the output tray.

Other affected systems include the ink supply ducting, the heat dissipation subsystem, and the electrical power supply and distribution subsystems. Countermeasures often include slowing down the carriage speed, pausing between passes of the carriage, pausing at the end of a page, and printing in multiple partially inked passes. Other countermeasures exist depending on the particulars of the print head design and function.

Figure 3:
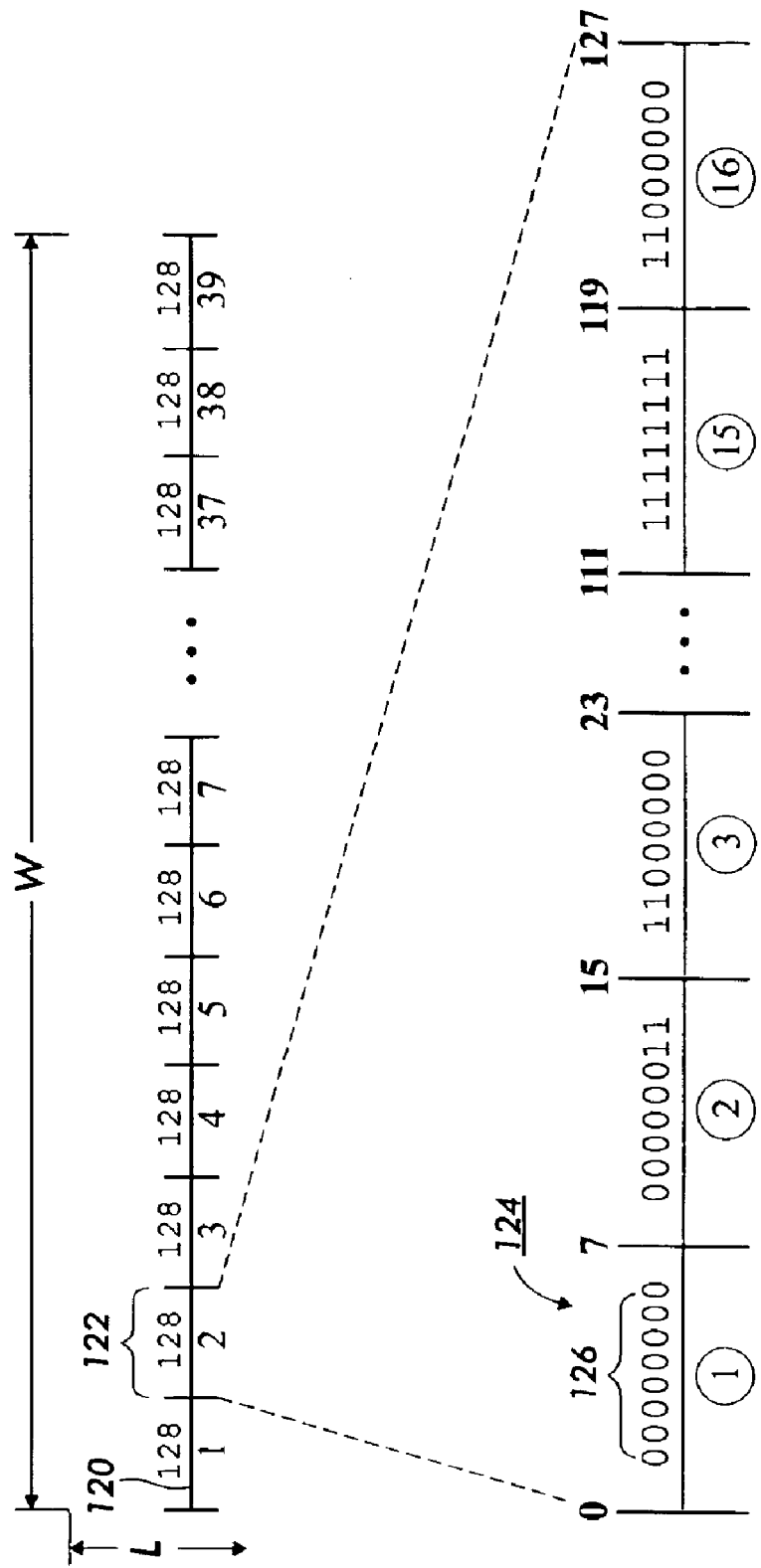
FIG. 3 is an exemplary diagram of the organization of image data according to this invention.

FIG. 3 illustrates bow the image data is divided into a plurality of "scan lines" 120. For example, a scan line can be a single row of pixels which extend horizontally across the entire image width W. However, it should be understood that a "scan line" 120 can include any number of configurations, such as a plurality of rows of pixels or a plurality of columns of pixels. To form an image, numerous "scan lines" 120 are consecutively positioned adjacent one another in a direction of a length L of the image as the image is printed.

In this example, the image width W is 8.32 inches, which translates into a scan line 120 having 4,992 pixels at 600 dpi. The scan line 120 is further divided into a plurality of frames 122, where each frame 122 is 128 pixels wide. Accordingly, this 4992-pixel-long scan line 120 is divided into 39 such frames 122. The actual image data, which represents the individual pixels can be 8, 16, or 32 bits long. For example, in FIG. 3, the frame 122 is divided using bytes, or 8-bit data blocks, 124. The individual pixels of the 8-bit blocks 124 are represented by a series of binary-valued bits 126, with the "1"s representing active pixels and the "0"s representing inactive pixels. Accordingly, each frame 122 comprises of sixteen such 8-bit blocks 124. It should be understood that any combination of data sizes can be used to fill a frame 122 (i.e., eight 16-bit blocks, four 32-bit blocks, four 16-bit blocks with two 32-bit blocks). It should also be understood that it is sufficient to count only the "1"s because the number of "0"s is easily gotten by subtraction of the count of "1"s from the number of pixels.

FIG. 4 is a block diagram showing in greater detail one exemplary embodiment of the pixel counter 300. As shown in FIG. 4, this exemplary embodiment of the pixel counter 300 includes a pixel counter controller 310, a counter 350, and a memory 370. As shown in FIG. 4, the pixel counter controller 310 is coupled to the bus 250 by a signal line 254. The pixel count controller 310 monitors or "snoops" the data communication sent over the bus 250 via the signal line 254.

In one exemplary embodiment, when data is sent on the bus 250, the pixel count controller 310 determines whether the image data flag on the image data flag portion 108 has been set to high. If the image data flag on the image data flag portion 108 is high, then the data on the bus 250 is image data. In response, the pixel count controller 310 reads the image data on the print data 104 portion of the bus 250. The read image data is transmitted across a signal line 326 to the counter 350. Additionally, if the image data flag on the image data flag portion indicates that print data is image data, the pixel count controller 310 transmits an enable signal to the memory 370 and the counter 350 across a signal line 322.

When the counter 350 is enabled, the counter 350 counts the active pixels present in the image data that is received from the pixel counter controller 326 over the signal line 326. The count of the active pixels is then transferred to the memory 370 over a signal line 366. Additionally, the counter 350 transfers a write enable signal to the memory 370 over a signal line 368.

In response to a request for pixel count information, the controller 220 can instruct the pixel count controller 310 to transmit an output enable signal over signal line 324. When the memory 370 receives the output enable signal from the pixel counter controller 310, the counter 350 will send any partial frames 122 to the memory 370. The memory 370 will take advantage of the 32-bit bus 250 and make the first four 8-bit count values available to the bus 350 over a set of signal lines 375. On each subsequent output enable signal generated by the pixel count controller 310 and transmitted over signal line 324 to the memory 370, the next four 8-bit count values can be made available to the bus 250 over the signal lines 375.

FIG. 5 is a block diagram showing in greater detail one exemplary embodiment of the pixel counter controller 310 according to this invention. The data on the bus 250 is input via the signal line 254. The data is received by each of a first logic block 312, a second logic block 314 and a third logic block 316. The first logic block 312 determines whether the image data flag on the image data flag portion 108 of the data is active (i.e., in a high position). If the image data flag on the image data flag portion 108 is active, then the first logic block 312 outputs an enable signal on the signal line 322 to the counter 350 and to the memory 370. Otherwise, the first logic block 312 does nothing.

Alternatively, the logic block 312 may determine whether the data is image data by determining if the address portion 110 is set to an address of the memory 370 which is multiply addressed. That is the memory responds equivalently to at least two combinations of bits 110. Logic block 312 should respond to only one of these combinations of bits of the address portion 110 to which the memory responds. If the address in the address portion 10 matches the image identifying address of the memory 370, then the first logic block outputs an enable signal on the signal line 322 to the counter 350 and to the memory 370. Otherwise, the first logic block 312 does nothing.

The second logic block 314 also receives the data from the bus 250 on the signal line 254. The second logic block 314 reads the image data on the image data portion 102 of the bus 250. The image data is then output on the signal line 326 to the counter 350. This action is necessary to follow the dynamic movement of the image data portion 102 across the data bus in some architectures.

The third logic block 316 also receives the data from the bus 250 on the signal line 254. The third logic block 316 detects when the pixel count controller 310 is receiving a request for pixel count information from the controller 220. When a request for pixel count information is received by the logic block 316, the logic block 316 outputs an output enable signal on the signal line 324 to the memory 370. As described above, the output enable signal from the logic block 316 instructs the memory 370 to begin writing the pixel count data stored in the memory 370 to the bus 250 over the signal lines 375.

Figure 6:
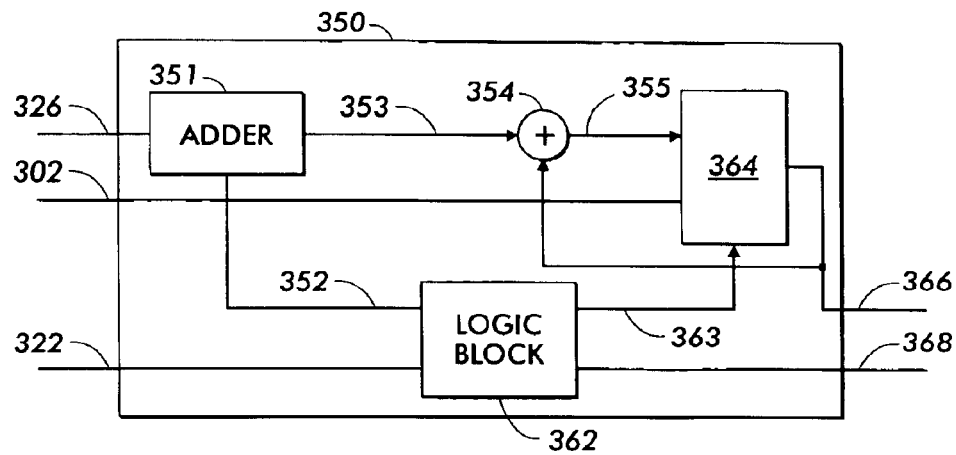
FIG. 6 is a block diagram of one exemplary embodiment of the pixel counter of FIG. 4.

FIG. 6 is a block diagram showing in greater detail one exemplary embodiment of the counter 350 according to this invention. Image data is input into the counter 350 on the signal line 326 and is subsequently added in an adder 351. The adder 351 sums the "on" bits of the image data, i.e., those bits having a logic value that indicates an active pixel is to be printed. The adder 351 outputs a count of the "on" bits of the data as an 8-bit value on a signal line 353 to a summing circuit 354. Additionally, the adder 351 outputs an increment signal on a signal line 352 each time the bits of the image data are summed. The increment signal represents how many pixels have been counted by the adder 351 and is output on the signal line 352 to a logic block 362.

The 8-bit count value on the signal line 353 is input into the summing circuit 354 and the count value is added by the summing circuit 354 to the current value on the signal line 366 output from a first accumulator register 364. The input value is not input by the first accumulator register 364 until the first accumulator register 364 receives a clock pulse over the clock signal line 302. Upon receiving the clock pulse, the input on the signal line 355 is latched by the first accumulation register 364 and output on the signal line 366. In this manner, the next count value from the summing circuit 354 is added to the output of the first accumulator register 364. Thus, the output of the first accumulator register 364 output on the signal line 366 is a count of the "on" pixels.

The logic block 362 receives the enable signal from the pixel counter controller 310 on the signal line 322 and an increment signal from the adder 351 on the signal line 352. While enabled by the enable signal, the logic block 362 outputs an enable signal on a signal line 363 to the first accumulation register 364. That is, when the enable signal on the signal line 363 is high, the accumulation register 364 is provided with valid image data, and therefore latches the running total of the number of high pixels from the summing circuit 354.

Additionally, the logic block 362 counts the increment signals received from the adder 351 in order to determine when a 128-pixel-long frame 204 has been counted. In one exemplary embodiment, the logic block 362 increments the count of increment signals on the rising edge of the increment signal that indicates that the active pixels of an 8-bit block of pixels, corresponding to the 8-bit image data portion 102, has been added by the adder 351. In this embodiment, since the data signal entering the adder 351 on the signal line 326 always contains eight bits of image data, the logic block 362 includes logic circuits to output the memory write enable signal over the signal line 368 once the logic block 362 has received 16 increment signals.

In other words, since each increment signal represents the counting of 8 pixels, 16 increment signals would indicate to the logic block 362 that a 128-pixel-long frame 204 has been counted. It should also be understood that this technique can similarly be applied to various sizes of image data (i.e., 16, 32, etc.). For example, if the image data portion contains 16 bits of image data instead of 8 bits of image data, the logic block 362 would include logic circuits to output the memory write enable signal over the signal line 368 once the logic block 362 had received 8 increment signals.

Alternatively, the increment signal can be a value which represents the size (i.e., 8, 16, 24, 32, etc.) of the image data portion 102. For example, if the image data portion 102 is 8 bits wide, then each time the adder 351 counts the active pixels of the 8-bit-wide image data, an increment value of 8 is sent to the logic block 362. Accordingly, when 128 bits of image data have been counted, the logic block 362 can output a memory write over signal line 368. Similarly, if the width of the image data on the image data portion 102 varies, the increment value can change to accommodate the width of the image data on the image data portion 102. This makes the pixel counter 300 more versatile, in that the pixel counter 300 would be able to operate on different bus 250 environments.

Figure 7:
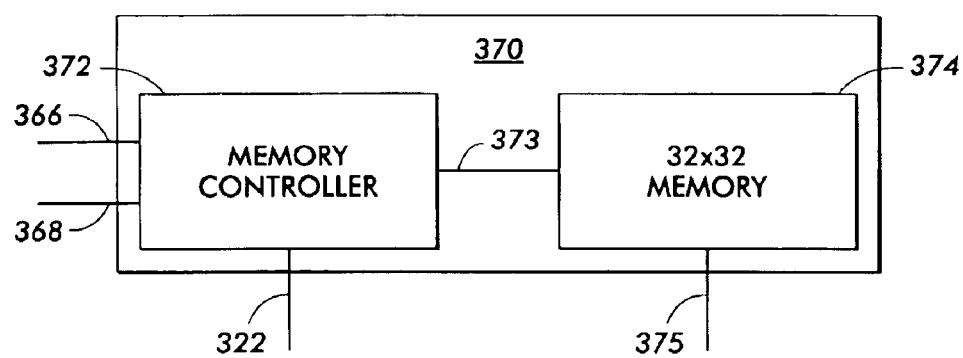
FIG. 7 is a block diagram of one exemplary embodiment of the memory of FIG. 4.

FIG. 7 is a block diagram showing in greater detail one exemplary embodiment of the memory 370 according to this invention. As described above, the counter 350 outputs a count of active pixels on the signal line 366 and a memory write enable signal on the signal line 368. The active pixel count changes as the counter 350 receives image data from the pixel count controller 310. The memory controller 372 holds the current active pixel count until the memory controller 372 receives a memory write signal from the counter 350 to write the active pixel count value to the 32×32 memory 374. When the memory controller 372 receives a memory write enable signal on the signal line 368, the memory controller 372 writes the active pixel count value, transmitted over the signal line 373, into a next available memory position in the memory 374.

As described above, the memory write enable signal is sent from the logic block 362 of the counter 350 after the counter 350 has examined an entire frame 122 of image data, i.e., 128 pixels. Accordingly, the active pixel count value is a count of the number of active pixels in 128 pixels the of image data. When the memory controller 372 receives an enable signal from the pixel count controller 310 on the signal line 322 and a memory write enable signal on the signal line 368, the memory controller 372 writes the active pixel count value to the 32×32 memory 374 over the signal line 373.

The 32×32 memory 374 can be divided into 128 8-bit cells. Accordingly, in this configuration, the memory 374 can store a scan line 202 that is 16,384 pixels in length (128 (8-bit cells)×128 (pixels)=16,384(pixels)). In other words, the scan line 202 can be 27.3 inches long if printed at 600 dpi.

The use of a 32×32 memory allows all the 128 8-bit count values to read in 32 register access. The memory controller 372 packs four count values in a single 32-bit memory location. When the output enable signal is output over the signal line 324 from the pixel counter controller 310, the memory controller 372 makes the first four count value available on a 32-line set of signal lines 375. When subsequent output enable signals are output over the signal line 324, the memory controller 372 will make the next set of four count values available to the 32-bit bus 250 by transmitting the next set of four count values over the set of signal lines 375.

Figure 8:
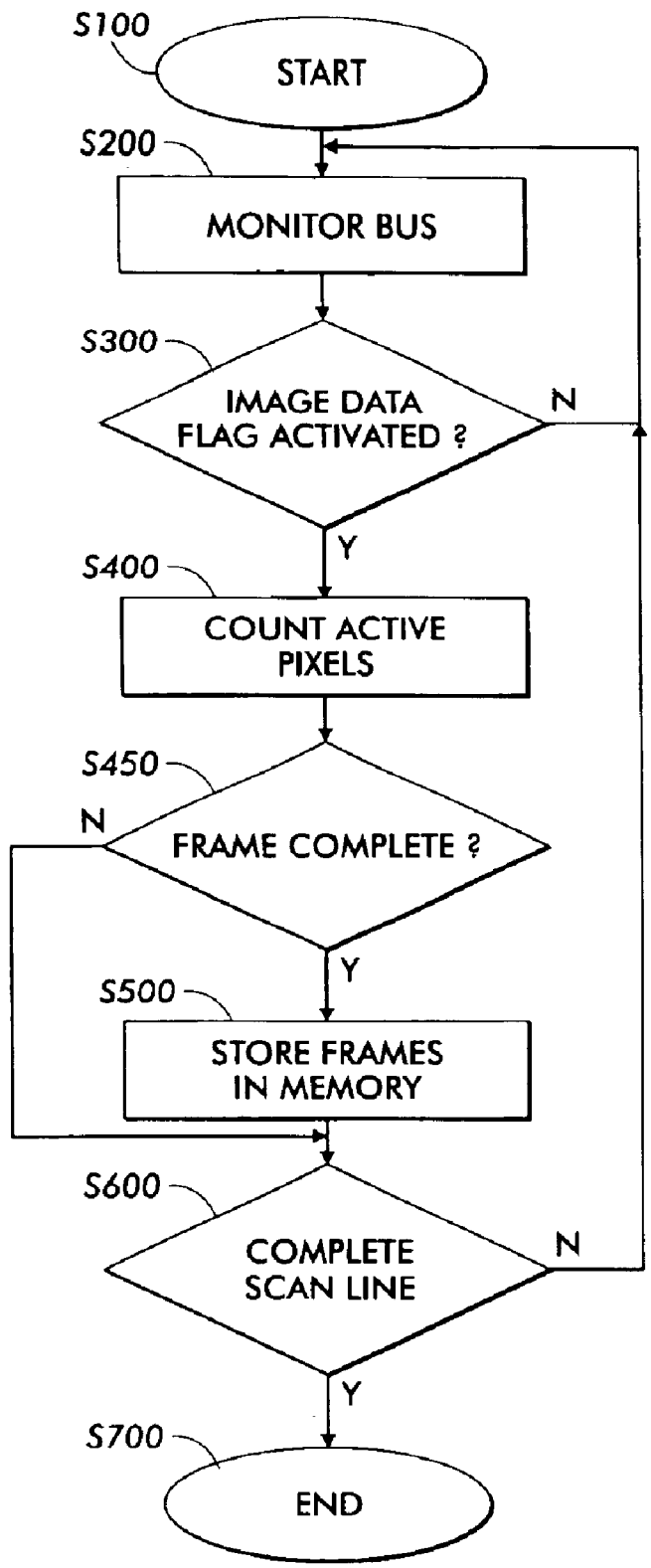
FIG. 8 is a flowchart outlining a first exemplary embodiment of the methods for counting pixels according to this invention.

FIG. 8 is a flowchart outlining a first exemplary embodiment of a method of counting pixels according to this invention. Beginning in step S100, control continues to step S200, where a pixel counter begins to monitor data traveling on a bus, waiting for image data to appear on the bus. Next, in step S300, as the data on the bus is monitored, the data is checked to determine whether an image data flag, transmitted on an otherwise unused channel of the address bus, has been made active. If the image data flag is active, then control continues to step S400. Otherwise, control returns to step S200.

In step S400, the active pixels present in the image data on an image data portion of the bus are counted and added to a frame total. Next, in step S450, the frame count is examined to determine if the frame is complete. If the frame is complete, the process goes to step S500, where the count of the active pixels is stored in a memory and the memory is advanced to a next frame. Otherwise, the control jumps to step S600, where a determination is made whether the image data corresponding to a complete scan line has been counted. If not, control again returns to step S200. Once a complete scan line has been counted, control continues to step S700 where the process ends.

Figure 9:
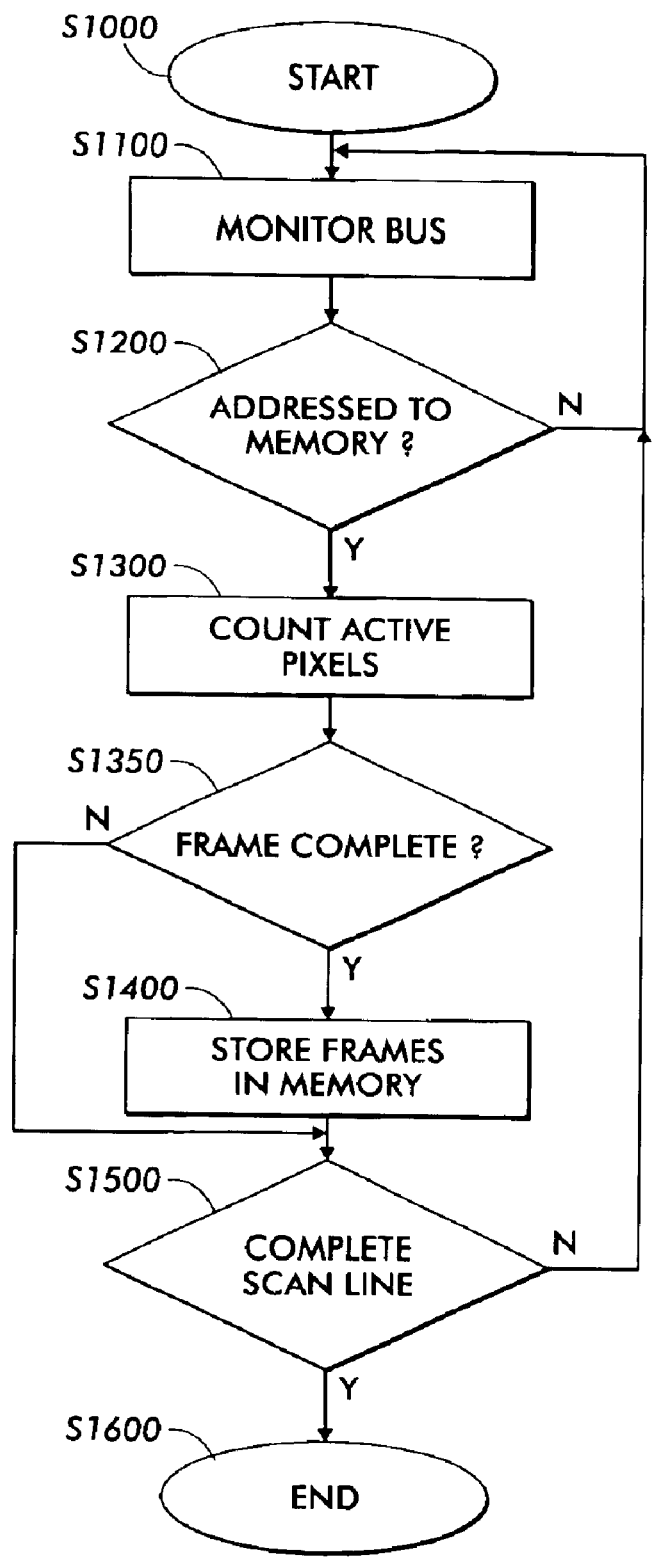
FIG. 9 is a flowchart outlining a second exemplary embodiment of the methods for counting pixels according to this invention.

FIG. 9 is a flowchart outlining a second exemplary embodiment of a method of counting pixels according to this invention. Beginning in step S1000, control continues to step S1200, where a pixel counter begins to monitor data present on a bus, waiting for image data to appear on the bus. Next, in step S1200, as the data on the bus is monitored, the print data is checked to determine whether the data on a component address portion of the bus is set to a value corresponding to a memory being written image data. If the data in the component address portion of the bus corresponds to the memory being written image data, then control continues to step S1300. Otherwise, control returns to step S1100.

In step S1300, the active pixels present in the image data are counted and added to a frame total. Next, in step S1350, the frame count is examined to determine if the frame is complete. If the frame is complete, then control goes to step S1400 where the count of the active pixels in the frame is stored in a memory and the memory is advanced to a next frame. Otherwise, control jumps to step S1500, where a determination is made whether the image data corresponding to a complete scan line has been counted. Once a complete scan line has not been counted, control again returns to step S1100. Otherwise, control continues to step S1600, where the process ends.

Figure 10:
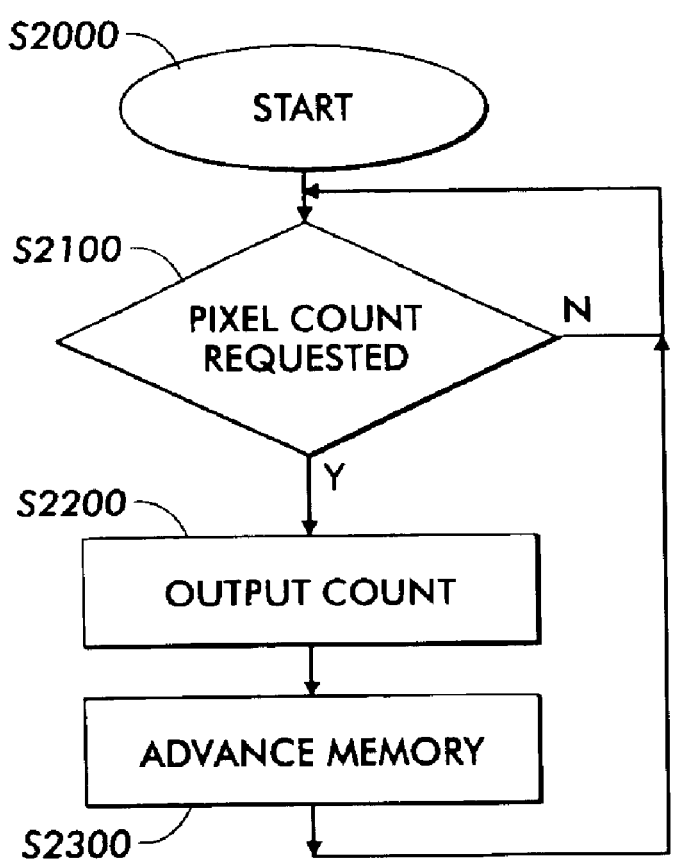
FIG. 10 is a flowchart outlining a method for reading pixel count data from a memory according to this invention.

FIG. 10 is a flowchart outlining an exemplary process of reading a pixel count from a memory. The process can be used regardless of the particular circuits and/or methods used to obtain the pixel count according to this invention. The process may also be used in parallel or subsequent to the storing of pixel count data. Beginning in step S2000 control continues to step S2200, where a determination is made as to whether a request for a pixel count has been received. If a request for a pixel count is not received then the process continues to wait for a request, otherwise, the control proceeds to step S2300.

In step S2300, the pixel count is output, for example to a processor, where the count data can be used to implement a print strategy. After outputting the pixel count in step S2300, control then proceeds to step S2400 where the memory is advanced to a next memory address of pixel count data. After step S2400, control then returns to step S2200 where the process waits for a next pixel count request.

Regardless of the particular circuits and/or methods used to obtain the pixel count according to this invention, the pixel count data can be used by a processor to develop a print strategy which maximizes the use of limited print resources. For example, some of the limited print resources include drying time, paper cockle due to humidity and ink loading, ink flow resistance to and in the print head, print head heat dissipation and electrical supply limitations.

As shown in FIGS. 4–7, the pixel counter 300 is preferably implemented using an application specific integrated circuit (ASIC). However, the pixel counter 300 can also be implemented using any other known or later developed integrated circuit, such as a digital signal processor, a hardwired electronic or logic circuit such as a discrete element circuit, a programmable logic device such as a PLD, PLA, FPGA or PAL, or the like. In general, any integrated circuit or logic device capable of implementing a finite state machine that is in turn capable of implementing the flowcharts shown in FIGS. 8, 9 and 10, can be used to implement the pixel counter 300.

Thus, it should be understood that each of the circuits shown in FIGS. 4–7 can be implemented as portions of a suitably designed ASIC. Alternatively, each of the circuits shown in FIGS. 4–7 can be implemented as physically distinct hardware circuits using a FPGA, a PDL, a PLA or a PAL, or using discrete logic elements or discrete circuit elements. The particular form each of the circuits shown in FIGS. 4–7 will take is a design choice and will be obvious and predictable to those skilled in the art.

While the systems and methods of this invention have been described in conjunction with the specific embodiments outlined above, it is evident that many alternatives, modifications and variations will be apparent to the those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. An apparatus that counts pixels in regions of interest within data present on a data bus in a printer, the data on the data bus including image data having active and inactive pixels, the apparatus comprising a pixel counter, coupled to the data bus, that selectively reads the image data from the data bus and that generates a pixel count based on the active pixels of the image data, wherein the active and non-active pixels contain different printing information for the printer.

2. The apparatus according to claim 1, wherein the pixel counter includes:
   a pixel count controller coupled to the data bus that determines whether the data on the data bus is image data based on the image data identifying portion;
   a counter coupled to the pixel count controller that counts the active pixels of the image data; and
   a memory, coupled to the pixel counter controller and the counter, that stores the pixel count.

3. The apparatus according to claim 1, wherein the data on the data bus includes a data portion, a memory address portion, and an image data identifying portion.

4. The apparatus according to claim 3, wherein the image data identifying portion is an image data flag that indicates whether the data on the data bus is image data.

5. The apparatus according to claim 3, wherein:
   the image data identifier portion includes an address; and
   when the image data identifier portion is the address of an image data memory connected to the bus, the pixel counter determines that the data on the data bus is image data.

6. The apparatus according to claim 1, wherein the image data is grouped into a scan line, the scan line comprising at least one row of pixels extending across an image.

7. The apparatus according to claim 6, wherein each scan line is divided into a plurality of frames, each of the frames comprising a predetermined number of consecutive pixels of the scan line.

8. The apparatus according to claim 7, wherein the plurality of frames are further divided into a plurality of pixel blocks, each of the pixel blocks comprising a predetermined number consecutive pixels of a frame.

9. The apparatus according to claim 7, wherein:
   the pixel counter generates the pixel count based on the pixel count in each of the frame; and
   a memory separately stores the active count of each frame.

10. The apparatus according to claim 6, wherein the pixel counter generates the pixel count based on the active pixels of each of the scan lines.

11. The apparatus according to claim 1, wherein the pixel counter comprises:

an adder that receives image data and counts the active pixels present in the image data;

a frame counter that measures the amount of image data being added by the adder and instructs a memory to read the active pixel count from the adder and store the read pixel count when a frame of image data has been counted.

12. A method for counting pixels in regions of interest within data on a data bus in a printer using an independent pixel counter connected to the data bus, the data on the data bus including image data having active and inactive pixels, the method comprising:

monitoring the data bus for data;

selectively reading, by the pixel counter image data directly from the data bus in response to an image data identifying portion of an address on an address bus;

generating, in the independent pixel counter, a pixel count based on the active bits of the read image data; and outputting the pixel count from the independent pixel counter, wherein the active and non-active pixels contain different printing information for the printer.

13. The method according to claim 12, wherein selectively reading the image data comprises selectively reading the image data from the data bus based on an active image data flag portion of the data on the data bus.

14. The method according to claim 12, wherein the image data is grouped into a scan line, the scan line comprising a single row of pixels extending across a width of an image.

15. The method according to claim 14, wherein each scan line is divided into a plurality of frames, each of the frames comprising a predetermined number of consecutive pixels of the scan line.

16. The method according to claim 14, wherein the plurality of frames are further divided into a plurality of pixel blocks, each of the pixel blocks comprising a predetermined number of consecutive pixels of a frame.

17. The method according to claim 14, wherein generating the pixel count comprises generating the pixel count based on the pixel count in each of the frames, and separately storing the pixel count of each frame.

18. The method according to claim 12, wherein selectively reading the image data comprises selectively reading the image data from the data bus based on an address in the image data identifying portion of the data, on the data bus.

19. The method according to claim 18, wherein the data on the data bus is image data if the address is the address of a memory.

20. The apparatus according to claim 1, wherein the image data on the data bus is directly read from the data bus to be provided to the pixel counter coupled to the data bus.

21. The method of claim 12, wherein selectively reading the image data on the data bus comprises selectively and directly reading the image data from the data bus and providing the image data read from data bus to the independent pixel counter.

22. The apparatus according to claim 1, wherein the printing information comprises instructions for a print head of the printer for marking pixels of an image.

23. The method according to claim 12, further comprising:

determining a high ink coverage area in a printed image.

24. The method according to claim 23, further comprising:

reducing a printing speed of the printer to allow extra drying time when a high ink coverage area is determined.

* * * * *